United States Patent
Hahn et al.

(10) Patent No.: US 7,502,375 B2
(45) Date of Patent: Mar. 10, 2009

(54) MODULAR AND SCALABLE SWITCH AND METHOD FOR THE DISTRIBUTION OF FAST ETHERNET DATA FRAMES

(75) Inventors: Hans-Walter Hahn, Darmstadt (DE); Wolfram Busching, Soelden (DE); Peter Wahl, Ludwigshafen (DE); Robert Wolf, Moerlenbach (DE)

(73) Assignee: Teldix GmbH, Heidelberg (DE)

( * ) Notice: Subject to any disclaimer, the term of this patent is extended or adjusted under 35 U.S.C. 154(b) by 853 days.

(21) Appl. No.: 10/470,961

(22) PCT Filed: Jan. 31, 2001

(86) PCT No.: PCT/EP01/01007

§ 371 (c)(1), (2), (4) Date: Jul. 31, 2003

(87) PCT Pub. No.: WO02/062023

PCT Pub. Date: Aug. 8, 2002

(65) Prior Publication Data

US 2004/0131073 A1   Jul. 8, 2004

(51) Int. Cl.
*H04L 12/56* (2006.01)
(52) U.S. Cl. .......... 370/401; 370/413; 370/428
(58) Field of Classification Search .......... 370/429, 370/422, 423, 401, 474, 412, 413, 419, 420
See application file for complete search history.

(56) References Cited

U.S. PATENT DOCUMENTS

| | | | |
|---|---|---|---|
| 5,521,913 A | * | 5/1996 | Gridley .......... 370/389 |
| 5,720,032 A | * | 2/1998 | Picazo et al. .......... 709/250 |
| 5,781,549 A | * | 7/1998 | Dai .......... 370/398 |
| 5,793,764 A | | 8/1998 | Bartoldus et al. |
| 6,717,910 B1 | | 4/2004 | Kasper et al. |

FOREIGN PATENT DOCUMENTS

| | | |
|---|---|---|
| EP | 0 339 782 A2 | 11/1989 |
| EP | 0 853 406 A2 | 7/1998 |
| EP | 0 996 256 A2 | 4/2000 |
| JP | 01-279354 | 11/1989 |
| JP | 09-168018 | 6/1997 |
| JP | 09-247204 | 9/1997 |
| JP | 10-210065 | 8/1998 |
| JP | 11-298513 | 10/1999 |
| JP | 2000-115252 | 4/2000 |
| WO | WO97/31455 | 8/1997 |
| WO | WO97/34349 | 9/1997 |

OTHER PUBLICATIONS

Bernard Daines, Gigabit Buffered Distributor Proposal, Nov. 21, 1996, Packet Engines Incorporated, Spokane WA.

* cited by examiner

*Primary Examiner*—Chi H. Pham
*Assistant Examiner*—Soon D. Hyun
(74) *Attorney, Agent, or Firm*—Day Pitney LLP

(57) ABSTRACT

For fast ethernet switches, a modular and scalable structure using programmable one-port communication modules is disclosed. The forwarding process is sequential and operates in a store-and-forward mode. The design follows a strictly predictable scheme. The forwarding process, the distribution logic, maximum latency and programmable functions, i.e. traffic monitoring capabilities, traffic filtering/policing capabilities and network management function capabilities are described and explained with reference to typical examples.

14 Claims, 7 Drawing Sheets

MODULAR AND SCALABLE SWITCH AND METHOD FOR THE DISTRIBUTION OF FAST ETHERNET DATA FRAMES

The invention relates to a modular and scalable structure for the design of fast ethernet switches accessing a common data distribution bus and to a method for the distribution of ethernet data frames according to store-and-forward mode.

At present ethernet switches, in particular those corresponding to the standard IEEE 802.1D are generally based on two different approaches for the realization of filtering and forwarding of ethernet frames, i.e.

a) store-and-forward mode and
b) cut-through-forwarding mode.

Switches as defined by IEEE standard 802.3 (1998 edition) operating according to the store-and-forward mode memorize incoming data frames completely before a subsequent forwarding. Filtering functions are applicable as long as data frames are received and/or are contained in a buffer. Such filtering functions comprise, for example, address detection and determination of the receiving port (always);
filtering of error containing frames by CRC checking (always);
traffic control for faulty frame structures (always), addresses, frame content, frame rate (partly or not).

The data flow of store-and-forward switches according to (a) is schematically shown in FIG. 4.

An input buffer 40 is always required for this switch structure. Such a data buffering strongly influences the functioning of the respective switch and may result in blocking conditions. Short term overload situations occuring if a receiving port is overloaded may be equalized by such intermediate buffering. The realization of the distribution to receiving ports depends on the respective architecture. One possibility is to provide for a further buffering of the data frames associated to a receiving or transmitting port as shown by optional output buffer 41. A disadvantage of said strategy is that due to the intermediate buffering additional latency has to be taken into account for the overall system.

Store-and-forward switches are usually processor-based systems. A processor or a fixed hardware logic filters the data of a plurality of ports which are subsequently distributed. As a rule, the distribution is performed by copying of a data frame in a shared memory of the switch to which also the processing unit of the receiving port has access to.

According to the cut-through-forwarding strategy (b) data frames are immediately forwarded subsequent to an analysis of the receiving address, i.e. without intermediate buffering. Compared to the above-mentioned strategy (a) the latency is minimized, however, no complex filtering functions can be applied since the data frames are transmitted in real-time for distribution. Error containing or garbled data frames (runts) are also forwarded, and accordingly allocate valuable bandwidth in the network.

FIG. 5 and FIG. 6 depict two architectures operating according to the shared-memory-principle, i.e. all ports have access to a common memory.

According to the block structure of FIG. 5, a centralized component 50 is responsible for processing and forwarding of all incoming data frames. If the number of ports and/or the data exchange increase, the centralized component 50 may become the bottle neck of the whole architecture. Moreover, the common data bus 51 is usually highly loaded since the complete data transfer is exchanged via said bus. At first, the incoming frames are transmitted via the common data bus 51 into shared-memory 52 to be filtered and forwarded by the central processing unit in the centralized component 50. Subsequently the data frames are distributed from the shared-memory 52 via a data bus 51 to output ports 53. Accordingly, each data frame runs over the bus 51 twice. This explains why the factor "2" must be used in the following equation for assessing the required bandwidth:

bandwidth=number of ports*input data rate*2=3.2 Gbit/sec (for 16 ports à 100 Mbit/s).

This equation is valid only if one frame has to be forwarded to one output port (unicast). For multicast distribution (one frame to plural outputs) the bandwidth is correspondingly increased. A typical example for a prior art ethernet switching structure according to the store-and-forward approach for 16 full duplex fast ethernet channels is followed-up by the company LEVEL ONE which uses a centralized net processor with the brand name IXP1200.

FIG. 6 shows another example for the mentioned shared-memory-principle having a distributed architecture. All subunits 60 operate independent of each other when data frames have to be forwarded only within the respective unit. The connection of plural subunits is provided for via a common data bus 61. Such a distributed architecture is easier scalable because an increase of the number of ports 62 can be implemented by adding of respective submodules.

A typical prior art representative of this type of architecture is the GALNETII-family of GALILEO TECHNOLOGY, LTD. The frame preprocessing and filtering on a port-by-port-basis is provided by a fixed hardware logic. This however is limited to a few functions only which cannot be modified or enlarged or programmed by the user. In particular, the limiting factor of this type of architecture is the bandwidth of the high speed connection (backplane). Moreover, due to the limited bandwidth of the backplane, a considerable decrease of the frame distribution speed has to be taken into account for multicast connections if a higher amount of ports must be served.

The cut-through-forwarding-strategy has been further developed by so-called cell-bus-switches. Incoming data frames are subdivided in data blocks (cells of equal size), therefore having a defined transmission time within the distribution unit of the switch. This offers the possibility of a data throughput which is independent of the data frame size, the data amount and the number of ports. At the destination port a defragmentation and reorganization of the cells is performed for restoring the original (complete) data frame, usually realized by recopying of the data frames in an output buffer. However, it must be observed that cell-based data distribution is not permissible for security-critical applications, e.g. avionic.

Finally, as far as the prior art is concerned, a completely different distribution of a data frame is realized with ASIC-based switches as shown in FIG. 7. After analyzing the target or receiver address a point-to-point connection is established via a crossbar matrix. Compared to the bus concepts briefly explained above, this crossbar matrix concept has the advantage that a plurality of connections may exist simultaneously, i.e. the bandwidth can be increased on demand. However, this advantage can only be achieved as long as no frames have to be forwarded to several ports simultaneously (multicast). In such a case the complete data distribution is blocked until each of the receiving ports is free for receiving a respective data frame.

A typical example of this type of architecture is the LS100/LS101-family of I-Cube, Ltd.

The advantages of the crossbar matrix technology are in general:
- high data throughput since a plurality of connections may exist simultaneously (aggregation);
- short latencies;
- seriell switching is possible;
- mere hardware solution, i.e. high robustness.

The disadvantages of this technology, on the other hand, are:
- a high number of pins is required (number of ports*2*bus bandwidth of the port interfaces), which means that a scalability is limited;
- no aggregation of bandwidth if frames have to be forwarded to several receiving ports:
- failure of the complex crossbar matrix unit results in a complete breakdown of the switch;
- no programmable frame processing is possible on a port basis.

It is an object of the invention to improve fast ethernet switches as well as the known methods for the distribution of ethernet data frames such that a much higher flexibility of data distribution management with a minimum of latency can be achieved on the basis of a store-and-forward mode concept.

According to the invention a modular and scalable structure for the design of fast ethernet switches is achieved having high flexibility of a unicast transfer or a multicast destination transfer in a minimum number of burst, preferably in one burst, i. e. one data transfer cycle by implementing in accordance with claim 1 each ethernet switch as an individually programmable one-port-communication module.

Advantageous embodiments, modifications and improvements are the subject-matter of dependent claims and are explained, also with reference to drawings, in the following description.

A method for the distribution of ethernet data frames according to a store-and forward mode is characterized, in accordance with claim 8, by implementing a modular and scalable structure of individually programmable one-port communication modules which are organized for internal data frame distribution such that each port after having received, stored and validated a data frame for completeness competes access to a high speed data distribution bus, whereby an arbitration scheme is used based upon port numbering and identification. Subsequently, a respective data frame is transferred to one or several receiving (output) port(s), preferably in one data frame cycle. The output ports independently decide, according to the status of an associated output buffer, whether to accept or to discard a respective transferred data frame.

Preferably, the data frames received within one communication module are real-time filtered at least with respect to bandwidth, frame size and frame addresses, in particular by a reduced instruction set controlling processor (RISC). It is advantageous if said controlling process, in accordance with the invention, can be modified on process as to the amount of filtering by reloadable configuration parameters.

A particular advantageous feature of the invention is that at least one of said one-port communication modules can be dedicated by specific configuration tables either before or during operation to traffic monitoring to allow to filtering and capture certain data frames for data traffic analysis without consuming additional bandwidth on a backplane.

A further advantageous feature of the invention is that any required maximum switch latency of less than a predetermined period is determined by the one-port communication module's output queue size only. A specific advantage may be achieved with the present invention if said or at lest one of said one-port communication modules is/are configured for the execution of one or several administration and/or management functions, e. g., by implementing a simple network/management protocol (SNMP), a management information base (MIB), in particular for representing the instance of the ethernet switch structure providing appropriate network addresses and/or application layer series, i. e. for an OSI layer accessible via any one-port communication module.

A specific further advantage of the invention is that data frames received within a specific one-port communication module are real-time processed by filtering at least with respect to bandwidth, frame size and frame addresses by a reduced instruction set control processing operating on OSI-layer two, i.e. a MAC layer.

In the following to avoid too much redundant explanations for the knowledgeable reader a number of abbreviations are used, which are, however, explained in the text.

The invention and advantageous details and embodiments thereof will be described in the following with reference to the accompanying drawings of which FIG. 1 depicts a functional block diagrams of a one-port communication module according to the invention;

Figure 4:
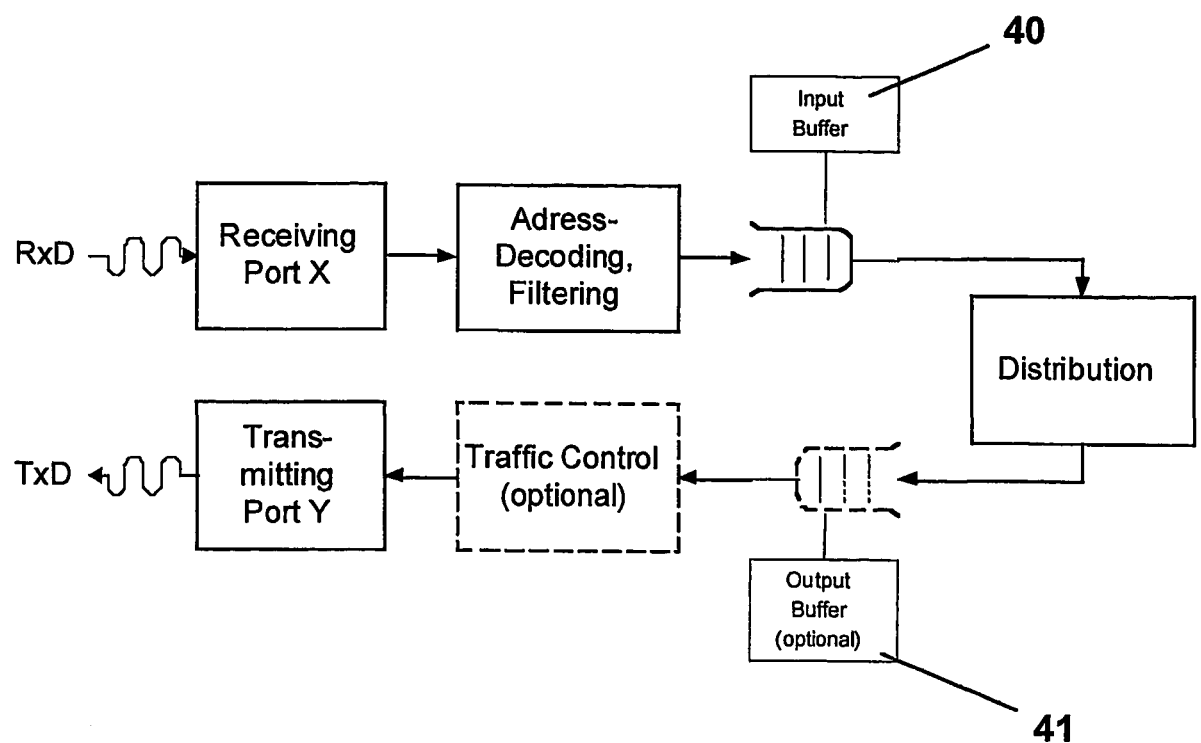
Figure 5:
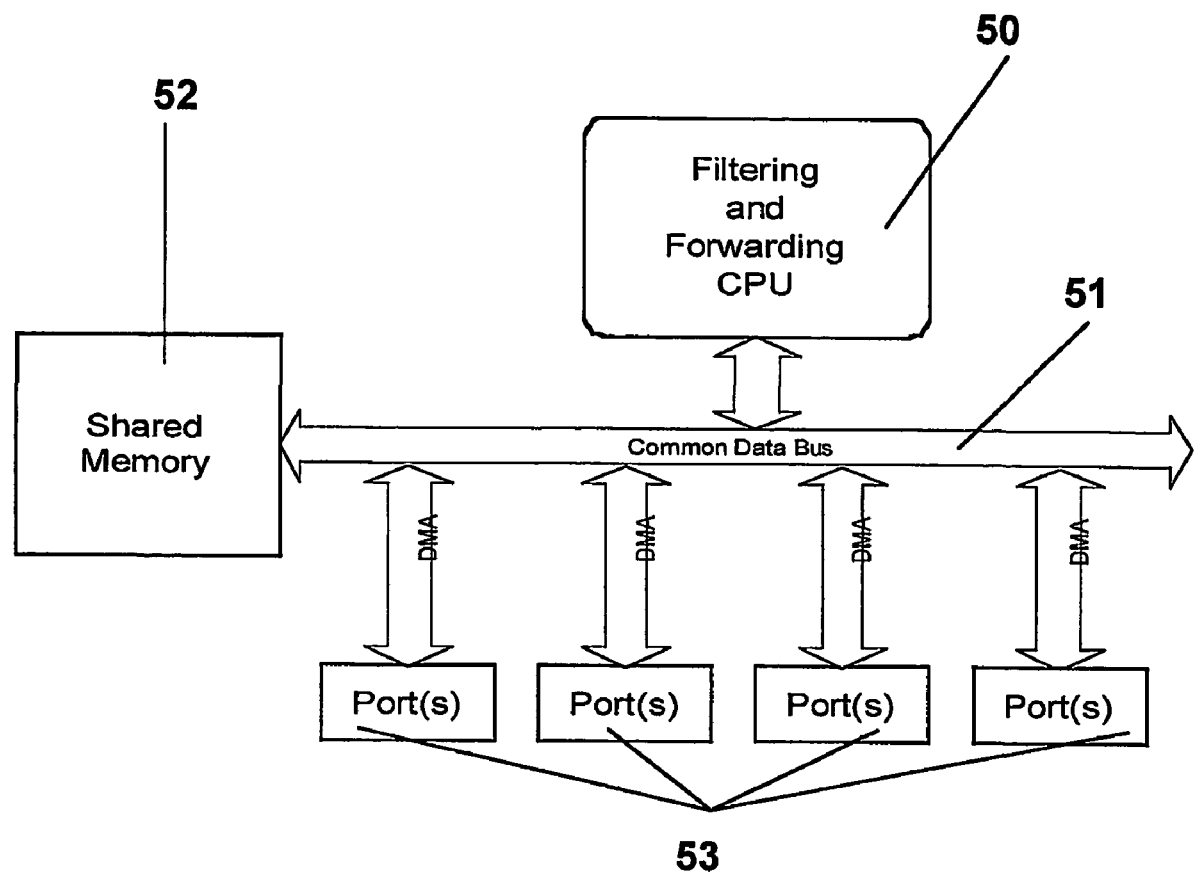
Figure 6:
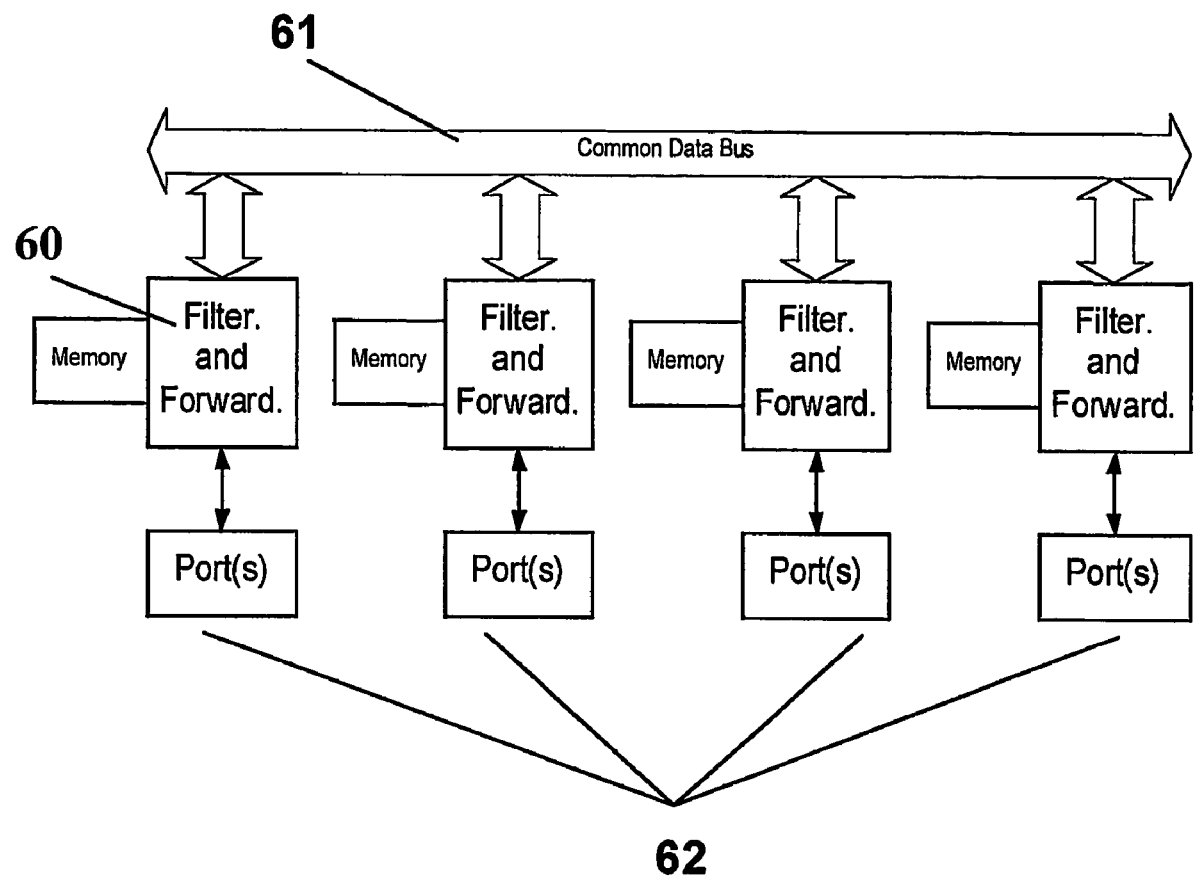
Figure 7:
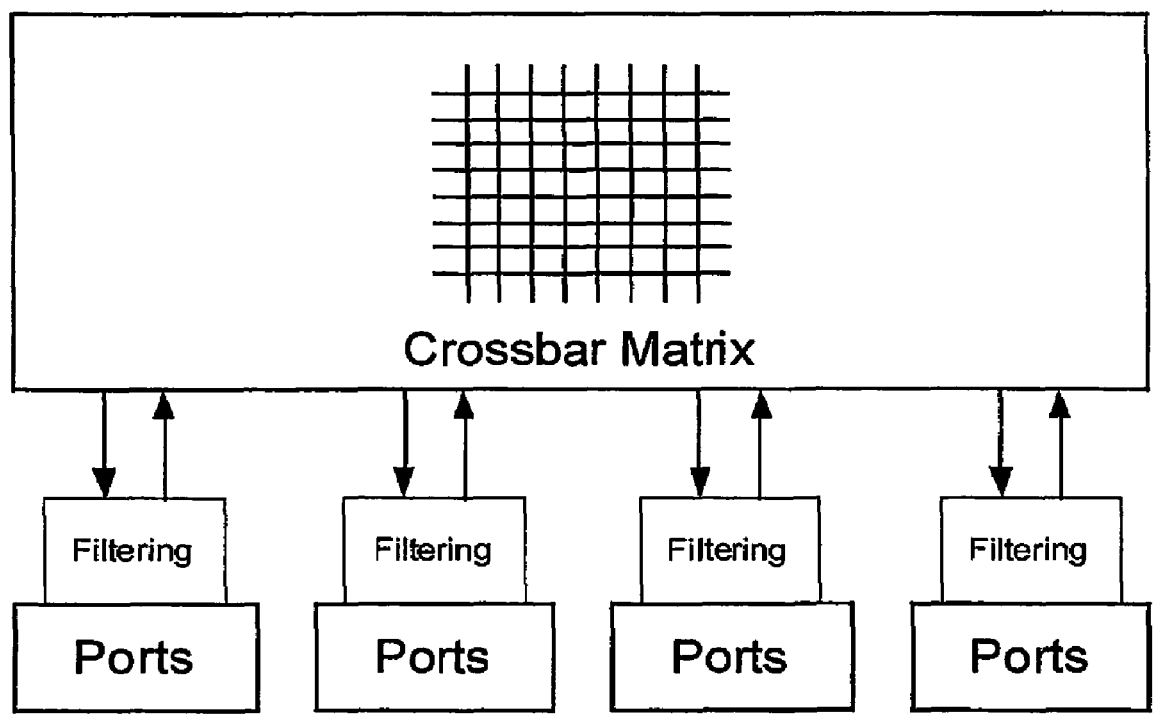

FIG. 4 visualizes the principle of a store-and-forward strategy arrangement according to the invention (already explained);

FIG. 5 shows a centralized architecture for processing and forwarding incoming data frames with use of a shared memory according to the prior art (already explained);

FIG. 6 shows a distributed architecture ethernet switch arrangement according to the prior art comprising independent subunits (already explained); and FIG. 7 shows an ASIC-based ethernet switch arrangement for point-to-point connection via a crossbar switch matrix according to the prior art (already explained).

The hardware structure of a typical example of an embodiment designed in accordance with the invention and its interaction with typical software functional elements will be described in the following with reference to FIGS. 1, 2 and 3.

Figure 1:
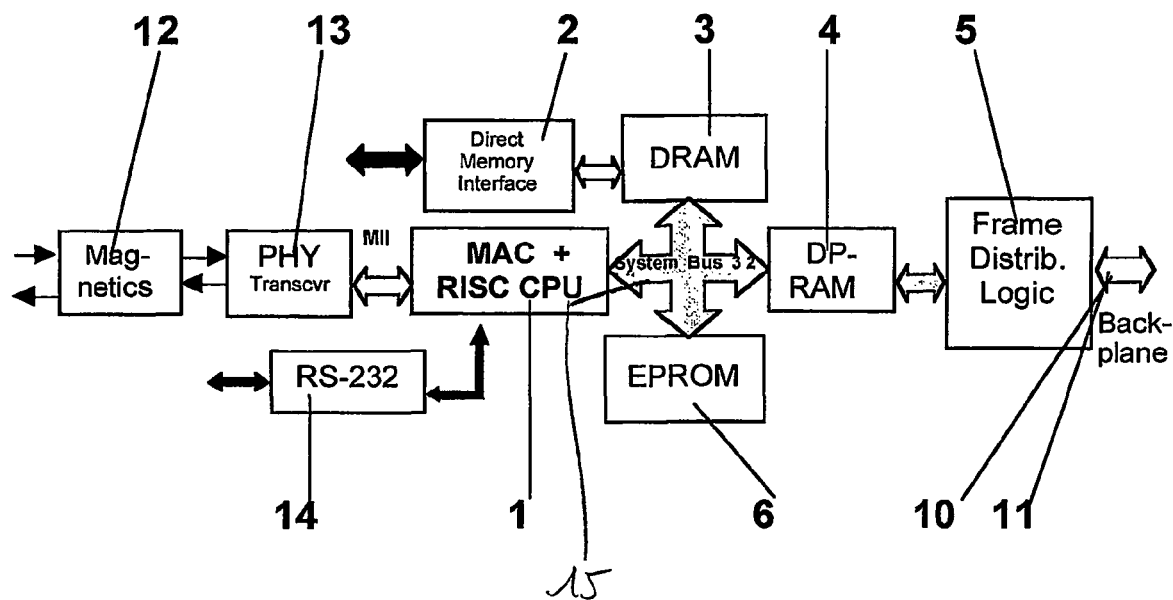

In the functional block diagram of FIG. 1 ethernet signals are supplied for example via a shielded and twisted two-wire-line per direction with galvanic separation by means of a magnetic coupling by transformer 12. There follows as a physical device a transceiver 13, i.e. an ethernet transmitter-/receiver unit taking care, amongst others, of parallel/seriell transformation and channel coding data line control. Transceiver 13 is linked to an ethernet medium access control unit 1 including a reduced instruction set controlled central processing unit, in the following MAC+RISC CPU 1 which is responsible for the structure and processing of ethernet frames, whereby this CPU 1 performs the stepwise processing in one processor cycle with a reduced simplified set of commands. Block 14 is a serial interface unit according to protocol RS-232 with asychronous start and stop bits and parity check corresponding to a COM interface of a PC with 115 kBaud max. MAC+RISC CPU 1 is connected via a system bus of, e.g. 32 bit, on the one hand, to a dual port RAM 4 (DPRAM), and, on the other hand, to a dynamic random access memory 3 (DRAM) that cooperates with a direct memory interface functional module 2 (DMA) performing memory-to-memory transfer operations independent of the CPU 1. An erasable program ROM 6 (EPROM) is connected via the system bus to CPU 1, DRAM 3 and DPRAM 4. The DPRAM 4 and a subsequent frame distribution logic 5 including a high speed arbiter 9 are shown for a plurality arrangement of one-port commmunication modules to set up an ethernet switch according to the invention in FIG. 3, connecting, on the one hand, to a high speed data bus 10 and, on the other hand, via the high speed arbiter 9 to a source 11 of arbitration bus and control signals.

Figure 2:
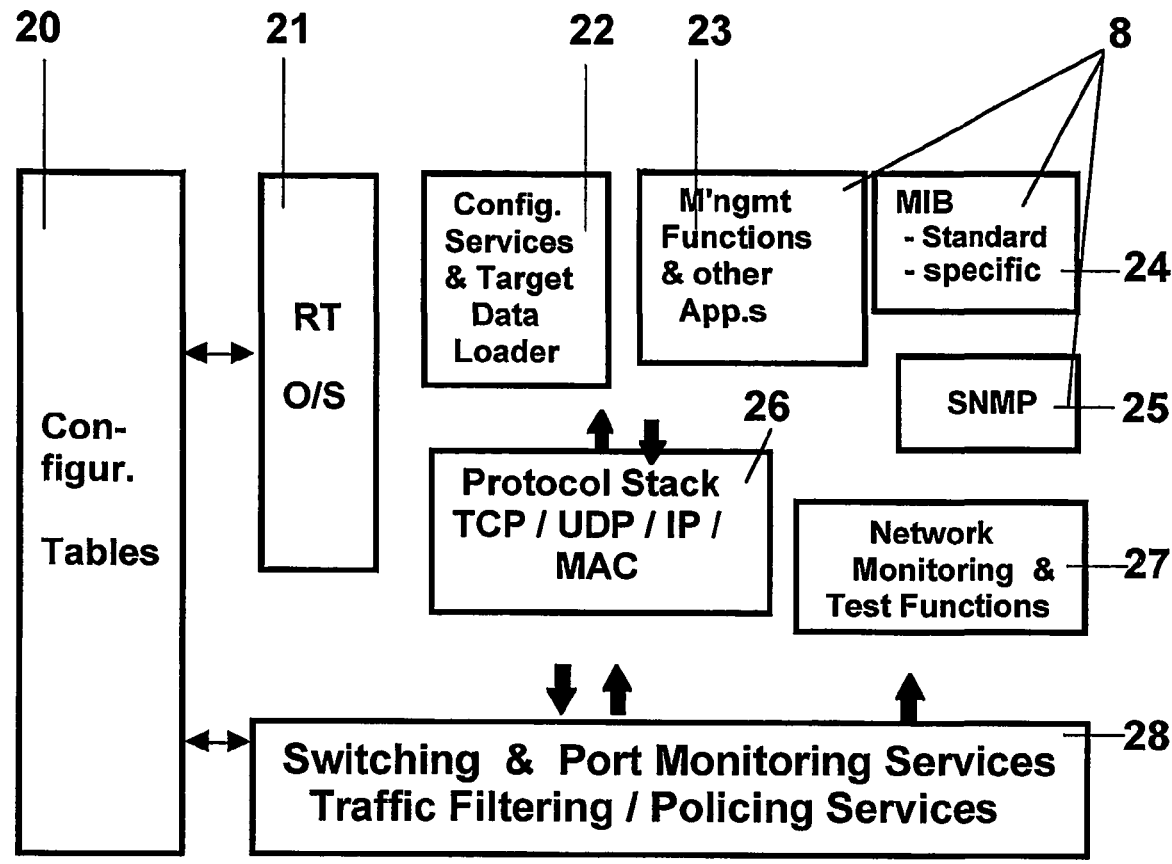
FIG. 2 shows blocks of interacting functional software elements as an example for typical one-port communication modules according to the invention.
Figure 3:
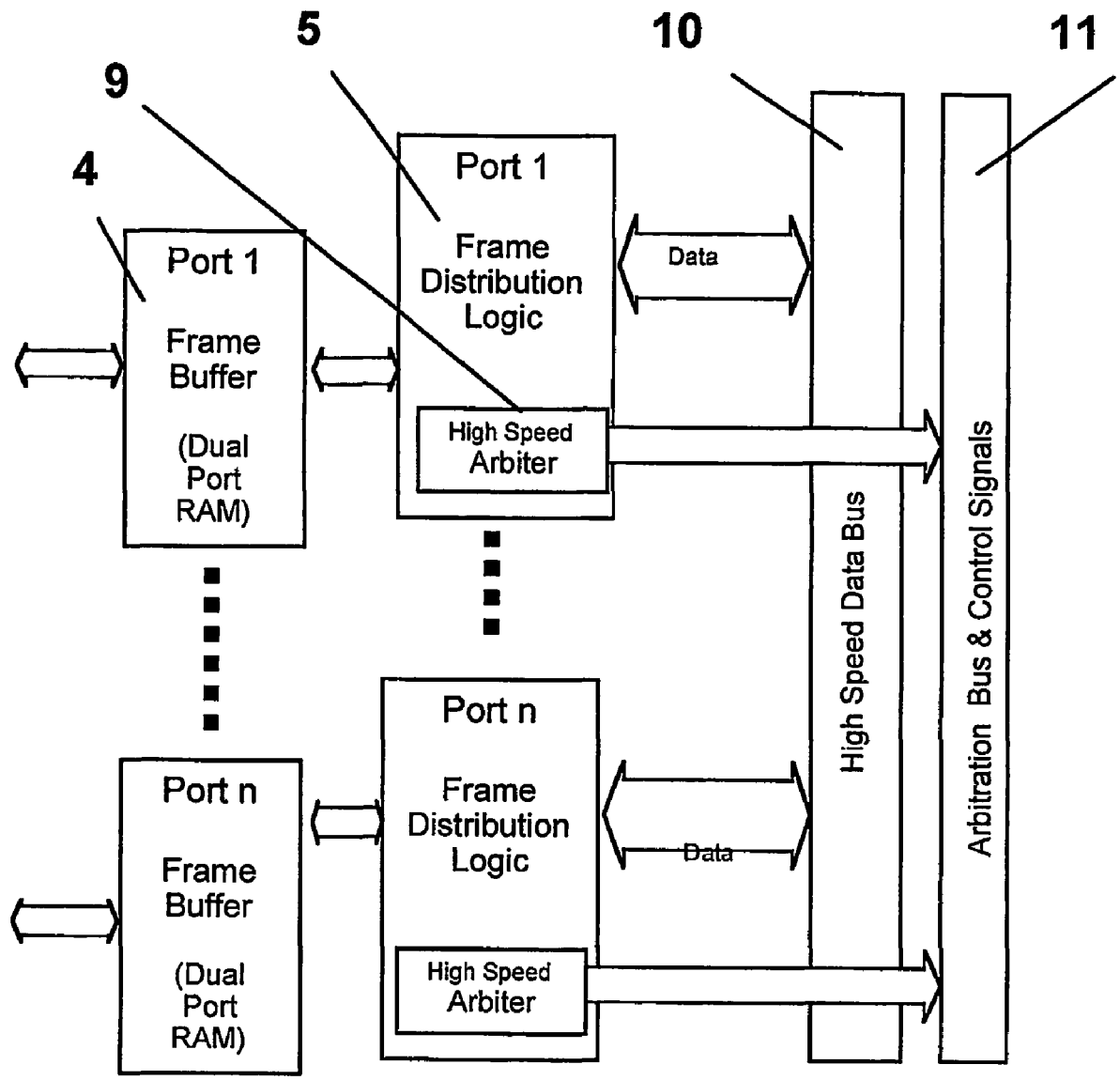
FIG. 3 shows a store-and-forward distribution logic block diagram.

The typical software functional elements of a one-port communication module according to the invention are visualized in FIG. 2. Such software functional elements comprise:
configuration tables 20 contained in an EPROM defining the precise function of the modules;
a real-time operating system 21;
a configuration service and target data loader 22 for loading of configuration data and their verification as well as for communication with a maintenance/user unit;
management function and application units 23 which is/are software module(s) for control, recording etc. of operating parameters;
a simple network management protocol in block (SNMP) 25, i.e. a protocol for transmission/exchange of operating parameters:
management information base (MIB) 24 including a system for classifying and coding of operational parameters;
a protocol stack block 26 required for performing a connection and exchange of data including a transfer control protocol (TCP), a user data protocol (UDP) and an internet protocol (IP);
a plurality of software modules 27 for network monitoring and test functions as well as data traffic;
a software/hardware module 28 for switching and port monitoring services, i.e. for switching of ethernet frames and for mirroring of the data exchange on a port/channel.

Traffic filtering in this context means filtering of the data according to defined criteria, e.g. frame-size, addresses, etc. Policing services refers to the control/monitoring of the data traffic in relation to determined data rate and bandwidth.

In the following the principle of operation will be described.

Using programmable, one-port communication modules according to the invention for the design of fast ethernet switches, the forwarding process is strictly sequential in nature, conforms to work-conserving service disciplines and operates in the store-and-forward mode mentioned above. A frame integrity checking before initiating the forwarding process implies the store-and-forward mechanism. In order to provide a maximum of determinism as required, e.g., in an airborne environment, this design according to the invention allows for an implementation of a strictly predictable scheme.

The mechanism works such that a port, after having received and processed, i. e. traffic filtering, policing, a valid and complete frame (:="store"), updates the (internal) header of this frame together with the appropriate forwarding information (CAM vector) in the frame buffer, i.e. in DPRAM 4, so that this frame is tagged/marked to be valid for forwarding. This will be accomplished by the switch's high speed data frame distribution logic 5 which as shown in FIG. 1 has also access to the DPRAM 4 (:="forward").

After competing for access to the switch's internal high speed data distribution bus 10, the data/frame distribution logic 5 now transfers the complete frame to one (unicast) or several (multicast) destination output port(s) in one burst depending on the CAM vector provided. Any output port independently decides due to the status of its output buffer, which again is the port associated DPRAM 4, whether to accept or discard the forwarded frame due to internal latency requirements explained below in further details.

As an example for a 16-port switch, a wire speed performance results in an internal frame distribution time of typically about 420 ns per frame (i.e. 16·148.800 minimum size frames per sec≈2,4 Mfps).

The data transfer rate of the data distribution bus 10 is high enough to keep all ports (e.g. up to 16 ports) permanently transmitting 64 byte sized frames at wire speed. Due to the structure of the one-port module, the port traffic filtering services can easily be implemented to perform in real-time on a frame-per-frame basis, which implies that the required switch relaying rate is only dependent on the transfer capability of the data distribution bus 10 (backplane).

The forwarding process via the frame distribution logic 5 operates as follows:

The internal data distribution mechanism works such that a port, after having received and validated a complete frame stored in the associated DPRAM 4, competes for access to the module's high speed data distribution bus 10. The decentralized high speed arbiters 9 which exist identical within each one port communication module's frame distribution logic 5 grants access to the bus 10 according to a fair arbitration scheme based upon port numbering or identification. The port now transfers the frame to one (unicast) or more (multicast) destination output port(s) in one burst. Any output port independently decides due to the status of its output buffer(s) whether to accept or to discard the transferred frame.

In accordance with the invention, the maximum latency is configurable as explained in the following:

The latency is defined as the difference between the arrival time of the first bit of a frame and the departing time of the first bit of the last instance of the same frame leaving the switch, whereby the term "last instance" refers to the multicast service where copied frames may leave the switch at different times.

As described further below, any additional delay due to the switch's internal data processing and forwarding functions is equal to zero and any required maximum latency of less than tbd ms is determined by the switch's output queue size located in DPRAM 4 only.

EXAMPLE

The maximum latency required is assumed to be 1 ms: For frames with 64 byte MAC data size the ouput queues have to be designed such that they are capable of holding 149 frames exactly corresponding to a media speed of 100 Mbps with an interframe gap of 96 bit. For frames of more than 64 byte in size, the number of frames stored in the output queues decreases respectively. This is due to the fact that the number of frames which can be transmitted at fixed media speed of 100 Mbps within an interval of $T_R$=1 ms decreases as the size of the frames increases.

As a result, the output queues of DPRAM 4 are designed to have a capacity or total size of 149*(size of the internal message block for 64 byte frames)[bytes].

Dependent of the status/level of the output queue(s), any port independently decides whether to accept or discard the frame forwarded by the Internal data distribution logic. The size of the one-port communication module's output queue is configurable by software or by loading configuration parameters during operation.

Programmable functions will be described in the following:

The traffic monitoring capabilities: Assuming a number n of one-port modules, one or several thereof can be dedicated to monitoring. The basic purpose of such a monitoring port is to allow to filter and capture certain frames for traffic analysis.

A monitoring port has its own configuration table which allows to select which MAC destination address from a set of input ports, except the monitoring port itself, should be recopied to the monitoring port output. The configuration table 20 therefore permits to select one or more MAC addresses which arrive at the switch and send them out via the monitoring port.

All non-monitor ports constantly send one copy of each received and valid frame to the monitoring port without occupying additional bandwidth of the high speed data bus 10. This is accomplished due to the data bus' inherent multicast capabilities as described above. The monitoring port's configuration table defines which of these frames are to be selected for transmission, e.g. by the MAC destination address. All other frames are ignored. Therefore, changes in the monitoring configuration do not impact the forwarding tables associated to all other ports.

The traffic filtering/policing capabilities: Each frame received can be evaluated with respect to application specific parameters stored in a configuration table in the EPROM 6 area. As the filtering/policing services are implemented in software due to the availability of one MAC+RISC CPU 1 per port, any algorithm can be applied depending on application specific requirements. In an airborne environment important filtering services extend to (but are not restricted to):

bandwidth and jitter control;
frame length control;
frame address control;
frame data control, and others.

For example, bandwith and jitter control can be accomplished by introducing the availability of a frame associated budget account value, which is based upon the following parameters:

the bandwidth allocation gap (expressed in seconds) associated to a specific MAC address,
the maximum budget account value according to a jitter value (expressed in seconds) associated to a specific MAC address.

The basic concept and goal of the described switch architecture according to the invention is to provide an optimum of bandwidth and data processing performance to all functional blocks between any pair of input and output ports, so that sustained wire speed processing can be achieved. This includes the performance of the port traffic filtering/policing function, mainly achieved (as an example) by a 32 bit MAC+ RISC CPU 1 dedicated to each port.

An Example for performance assessment can be given as follows:

The maximum load onto the input port of a switch is imposed when it receives frames of minimum size, e.g. 64 bytes for a MAC data field corresponding to 18 bytes of user data using UDP/IP, with a minimum interframe gap of 12 bytes. At a media speed of, e.g., 100 Mbps this will result in about 149 frames/ms. According to the IEEE 802.3 Ethernet MAC Frame Structure and without an IEEE 802.1 p/1Q Tag Header of 4 bytes, the entire MAC frame size is 84 bytes.

The ethernet MAC devices located within each switch port are configured to store not only the MAC protocol data unit, but a so-called internal message block which includes also the CRC field, MAC source and destination addresses, type/length field as well as other frame specific information, i. e. time stamps, status, pointers, CAM vector, etc., used for the switching services. Assuming a worst case size of 128 byte (=32·4 byte, i.e. a 32 bit word) for the minimum sized internal message block, the RISC CPU's processing power needed to perform bandwidth control, i.e. budget account policing as well as for updating the message block will amount to the following number of instructions per second (IPS):

$$149 \cdot 10^3 \cdot 20 \ IPS = 2.98 \ MIPS \ \text{(traffic policing, 20 cycles)}$$
$$\underline{149 \cdot 10^3 \cdot 32 \ IPS = 4.77 \ MIPS \ \text{(message block updating, 32 cycles)}}$$
$$\Sigma \approx 7.75 \ MIPS$$

The remaining typical traffic filtering services, i.e. frame and MAC destination address based filtering, can be assessed to additional ≈2.25 MIPS, so that the total CPU load amounts to ≈10 MIPS for a port running at full wire speed with frames of minimum size. In using one MAC+RISC CPU 1 per port with only 10 MIPS, frame filtering in real time on a frame per frame basis can be provided even at full wire speed.

The computing time needed for traffic filtering of one frame can be calculated to 10 MIPS/149·10³ frames≈67 IPS/frame, which results in 1.34 μs at a CPU cycle time of 20 ns, i.e. for a 50 MHz RISC CPU 1; at 33 MHz the computing time needed amounts to 67·33 ns=2,2 μs.

Received frames are transferred to the DRAM 3 by the DMA controller of the MAC+RISC CPU 1. At full wire speed, frames with 64 bytes of MAC data have a frame duration of ≈5.76 μs followed by 0.96 μs for 12 octets of the interframe gap. This results in a total minimum transfer time of 6.72 μs for one frame.

Thus, only 1.34/6.72≈20% (for 2.2/6.72≈33%, respectively) of the minimum frame transfer time is used, which in fact means that any additional delay due to the switch's internal data processing and forwarding function is equal to zero and the required maximum latency of less than 1 ms is determined by the switch's output queue size only.

This statement is true related to a time $t_0$ =0 for a frame transferred and stored in DPRAM 4 completely. The frame filtering process then starts immediately and is executing in parallel with the MAC+RISC CPU 1 receiving process of the next frame (pipeline operation).

The network management function capabilities are described in the following:

The module-based switch architecture according to the invention provides capabilities to access public internal information through a simple network management protocol (SNMP) accessible management information base (MIB) by implementing, e.g., a user data protocol/internet protocol (UDP/IP) and a simple network management protocol on the MAC+RISC CPU 1 of any port as indicated by reference sign 8 in FIG. 2. The interface is such that the SNMP protocol is used to access this information.

In order to avoid that internal SNMP related traffic occupies too much of the switch's backplane bandwidth, resulting in a decreased performance, i. e. increased latency, relaying rate, etc., the shared memory bus of the direct memory interface (DMI) 2 can be used instead. This DMI 2 provides a separate, e.g., 16 bit bus and allows for exchange of data stored in each CPU's local memory, i.e. DRAM 3, EPROM 6 and DPRAM 4.

Further, in case of a port specific failure within its switching services, this approach still enables the monitoring of the MAC+RISC CPU 1 to acquire status/error information on the respective faulty port, which would not work with, e.g., a solution of mixed traffic and status information on the backplane.

The invention claimed is:

1. Modular and scalable architecture of fast ethernet switches characterized in that an ethernet switch unit is implemented as a plurality of individually programmable one-port communication modules for accessing to a common distribution bus, and wherein each one-port communication module comprises:

an ethernet medium access unit including a programmable micro-controller organized as a reduced instruction set controller, and a data frame distribution logic allowing real-time-processing and forwarding complete ethernet data frames arriving on said specific one-port communication module to addressed destination ports according to a store-and-forward mode; and a dual-port frame buffer arranged to cooperate, on the one hand, with the programmable micro-controller, and, on the other hand, with the data frame distribution logic, wherein the complete Ethernet data frames are stored in the dual-port frame buffer before they are forwarded to the addressed destination ports.

2. The fast ethernet switch architecture of claim 1, wherein each dual-port frame buffer cooperates, on the one hand, with said programmable microcontroller and, on the other hand, with said data frame distribution logic such that a received and valid data frame is updated at least to its forwarding information in said frame buffer to be valid for forwarding via said data distribution bus.

3. The fast ethernet switch architecture of claim 2, wherein an arbiting logic (9) is provided decentralized in each of said one-port communication modules and associated to a respective one of said data frame distribution logics (5) for granting access of valid data frames to said data distribution bus (10) according to a fair arbiting and control signal scheme based upon port numbering or identification.

4. The fast ethernet switch architecture of claim 1, wherein said programmable microcontroller is accessable for individual programming via an interface unit.

5. The fast ethernet switch architecture of claim 4, wherein said interface unit is a RS-232 interface.

6. The fast ethernet switch architecture of claim 1, wherein a direct memory interface (DMI 2) is provided associated to a DRAM (3) for direct memory-to-memory operation and/or exchange of management data and/or status information in case of failure within the data frame distribution logic (5) or the data bus (10).

7. A method for the distribution of ethernet data frames according to a store-and-forward mode using a modular architecture comprising independently and individually programmable one-port communication modules utilizing the following steps:

implementing said modular and scalable structure of individually programmable one-port communication modules organized for internal data frame distribution such that each port, after having received, stored and validated a data frame for completeness competes for access to a high speed data distribution bus according to a fair arbitration scheme based upon port numbering or identification, transferring a respective data frame to at least one output port in a defined number of data frame cycles and implementing that any output port independently decides by the status of its output buffers whether to accept or to discard said respective transferred data frame.

8. The method of claim 7, characterized in that said defined number of data frame cycles is one and only one regardless of the number of output ports to be simultaneously served by said respective one-port communication module.

9. The method of claim 7, wherein data frames received within said one-port communication module are real-time processed by filtering at least with respect to bandwidth, frame size and frame addresses by a reduced instruction set controlling process operating on OSI-layer two (MAC layer).

10. The method of claim 9, characterized in that said controlling process is modifyable on process as to the amount of filtering by reloadable configuration parameters.

11. The method of claim 7, characterized in that at least one of said one-port communication modules can be dedicated by specific configuration tables before and/or during operation for traffic monitoring to allow to filter and capture certain data frames for traffic analysis.

12. The method of claim 7, characterized in that any required maximum switch latency of less than a predetermined period (tbd[ms]) is determined by the one-port communication module's output queue size only.

13. The method of claim 7, characterized in that at least one of said one-port communication modules is configured for execution of at least one administration/management function.

14. The method according to claim 13, characterized in that said at least one administration/management function is implemented by a simple network management protocol (SNMP) and/or a management information base (MIB) for representing the instance of the ethernet switch structure providing a respective appropriate network addresses and application layer (OSI layer 7) accessible via any one-port communication module.

* * * * *